US012663906B2

(12) United States Patent 
Wang et al.

(10) Patent No.: US 12,663,906 B2 
(45) Date of Patent: Jun. 23, 2026

(54) TWO-WIRE FABRIC TOUCH PANEL

(71) Applicant: WUYI UNIVERSITY, Jiangmen (CN)

(72) Inventors: Fei Wang, Jiangmen (CN); Jiehong Zheng, Jiangmen (CN); Xi Wang, Jiangmen (CN); Juejing Dai, Jiangmen (CN); Hui Yu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 0 days.

(21) Appl. No.: 18/802,125

(22) Filed: Aug. 13, 2024

(65) Prior Publication Data

US 2025/0216996 A1 Jul. 3, 2025

(30) Foreign Application Priority Data

Dec. 27, 2023 (CN) .......................... 202311833464.6

(51) Int. Cl. 
G06F 3/045 (2006.01)

(52) U.S. Cl. 
CPC .... G06F 3/045 (2013.01); *G06F 2203/04102* (2013.01)

(58) Field of Classification Search 
CPC ........................ G06F 3/045; G06F 2203/04102 
See application file for complete search history.

(56) References Cited

U.S. PATENT DOCUMENTS

| | | | | |
|---|---|---|---|---|
| 2006/0102452 A1* | 5/2006 | Cok | ......................... | G06F 3/045 |
| | | | | 200/5 A |
| 2006/0274048 A1* | 12/2006 | Spath | ...................... | G06F 3/045 |
| | | | | 345/173 |
| 2019/0234817 A1* | 8/2019 | Sun | ....................... | A61B 5/0536 |
| 2020/0348819 A1* | 11/2020 | Usui | .................... | H03K 17/965 |

FOREIGN PATENT DOCUMENTS

WO WO-9960357 A1 * 11/1999 ............... G01B 7/28

* cited by examiner

*Primary Examiner* — Patrick N Edouard 
*Assistant Examiner* — Joseph P Fox 
(74) *Attorney, Agent, or Firm* — Vivacqua Crane, PLLC

(57) ABSTRACT

A two-wire fabric touch panel includes a first wire, a second wire, an upper conductor layer, a middle conductor layer, and a lower conductor layer. The first wire is connected to the upper conductor layer, and the second wire is connected to the lower conductor layer. The middle conductor layer has a conductivity significantly lower than conductivities of the upper conductor layer and the lower conductor layer, and the middle conductor layer has different resistances at various positions in a plane. At least one of the upper conductor layer and the lower conductor layer is isolated from the middle conductor layer when an external force is absent, and a resistance between the upper conductor layer and the lower conductor layer is infinite. The upper conductor layer and the lower conductor layer are connected through the middle conductor layer at the pressure position when subjected to pressure.

10 Claims, 2 Drawing Sheets

TWO-WIRE FABRIC TOUCH PANEL

CROSS-REFERENCE TO RELATED APPLICATION

This application is based on and claims the benefit of priority from Chinese Patent Application No. 202311833464.6, filed on 27 Dec. 2023, the entirety of which is incorporated by reference herein.

TECHNICAL FIELD

Embodiments of the disclosure relate to, but are not limited to, the technical field of smart textiles, and particularly, to a two-wire fabric touch panel.

BACKGROUND

With the development of science and technology, intelligentization is entering people's daily lives. This has given rise to many hybrid products that combine textile products with electronic devices. The fabric touch panel technology is particularly important. In the future smart textile industry, the fabric touch panel technology will play an important role equivalent to the keyboard and mouse in contemporary electronic computers. Therefore, the fabric touch technology is one of the important technologies in the smart textile industry.

Currently, mainstream fabric touch panel technologies fall into two categories. One is based on the principle of capacitive or resistive pressure sensors. Resistive sensor touch textiles recognize touch by monitoring changes of resistance of the resistive sensor matrix of the fabric to achieve tactile effect. Capacitive touch panels recognize touch by detecting changes of capacitance of the capacitive sensor matrix of the fabric. The other one is based on the four-wire resistive touch screen principle. However, these technologies have some problems. For example, the former's matrix sensing requires a large number of wires, resulting in complicated wiring and significant problems such as interference and parasitic capacitance. Although the number of wires in the latter has been somewhat reduced, it still requires four wires, and has low position identification accuracy.

When making smart textiles, the use of wires should be minimized. Developing fabric touch panel technology that requires fewer wires would significantly enhance the overall stability and robustness of smart textiles. In addition, considering the requirements for special scenarios, such as medical, military, police, and firefighting, where the number of wires may be strictly limited, even four wires cannot meet the requirements for device simplification and miniaturization. Therefore, how to develop a fabric touch panel with a simple structure and fewer wires has become an urgent technical problem to be solved.

SUMMARY

The following is a summary of the subject matter described in detail herein. This summary is not intended to limit the scope of the claims.

An embodiment of the disclosure provides a two-wire fabric touch panel that is simple in structure, low in cost, occupies less back-end circuits and computing resources, and can identify a single touch position and only requires two wires.

In a first aspect, an embodiment of the disclosure provides a two-wire fabric touch panel, including: a first wire, a second wire, an upper conductor layer, a middle conductor layer, and a lower conductor layer. The first wire is connected to the upper conductor layer, the second wire is connected to the lower conductor layer, the middle conductor layer has a conductivity significantly lower than conductivities of the upper conductor layer and the lower conductor layer, and the middle conductor layer has different resistances at various positions in a plane. At least one of the upper conductor layer and the lower conductor layer is isolated from the middle conductor layer when an external force is absent, and the resistance between the upper conductor layer and the lower conductor layer is infinite. The upper conductor layer and the lower conductor layer are connected through the middle conductor layer at a pressure position when subjected to pressure, such that a resistance signal is measured through the upper conductor layer and the lower conductor layer, and at least two of the upper conductor layer, the middle conductor layer, and the lower conductor layer remain isolated.

In some embodiments, at least one of the upper conductor layer and the lower conductor layer has a non-conductive protrusion structure to support the upper conductor layer and/or the lower conductor layer to remain isolated from the middle conductor layer.

In some embodiments, the two-wire fabric touch panel further comprises an elastic isolation layer between one of the upper conductor layer and the lower conductor layer and the middle conductor layer, or comprising elastic isolation layers respectively between the upper conductor layer and the middle conductor layer, and between the middle conductor layer and the lower conductor layer. The elastic isolation layer or each of the elastic isolation layers is provided with through holes, such that when subjected to the external force, at least one of the upper conductor layer and the lower conductor layer is in contact with the middle conductor layer through the through holes to form a conductive path.

In some embodiments, the upper conductor layer, the middle conductor layer, the lower conductor layer, and the elastic isolation layer or layers are made of a textile material, and the elastic isolation layer or each of the elastic isolation layers is of a planar structure or a curved surface structure.

In some embodiments, the elastic isolation layer is any one of an elastic mesh fabric, an elastic net fabric, or a loose-structured elastic fabric woven or knitted from elastic fibers, and is connected to at least two of the upper conductor layer, the middle conductor layer, and the lower conductor layer through adhesives, sewing integration or three-dimensional weaving or knitting technology.

In some embodiments, when the middle conductor layer is a continuous conductor, a thickness of each unit plane of the middle conductor layer is significantly lower than a width and a length of the unit plane.

In some embodiments, each of the upper conductor layer and the lower conductor layer is a fabric with a metal coating or a conductive composite material coating or an intrinsic conductive polymer coating, or a fabric woven or knitted from conductive fibers, or a fabric woven or knitted from a mixture of conductive fibers and non-conductive fibers.

In some embodiments, the two-wire fabric touch panel further includes a fabric layer, where the upper conductor layer and the lower conductor layer are attached to the fabric layer through screen printing, stencil printing or spraying.

In some embodiments, the upper conductor layer and the lower conductor layer are double-layer or multi-layer flexible conductive films obtained by deposition, chemical plating, or electrochemical plating.

In some embodiments, the middle conductor layer is any one of a conductive nanocomposite, a conductive polymer composite material, and a conductive fabric, and each unit square of the middle conductor layer is subjected to different number of printings to form different surface resistances, or conductive materials with different resistivities are printed on each square respectively to form different surface resistances for each square, or conductive yarns, filaments or fibers with different resistance at each section are woven or knitted into cloth according to specific rules.

A two-wire fabric touch panel provided by an embodiment of the disclosure includes: a first wire, a second wire, an upper conductor layer, a middle conductor layer, and a lower conductor layer, where the first wire is connected to the upper conductor layer, and the second wire is connected to the lower conductor layer. The middle conductor layer has a conductivity significantly lower than conductivities of the upper conductor layer and the lower conductor layer, and the middle conductor layer has different resistances at various positions in a plane. At least one of the upper conductor layer and the lower conductor layer is isolated from the middle conductor layer when an external force is absent, and the resistance between the upper conductor layer and the lower conductor layer is infinite. The upper conductor layer and the lower conductor layer are connected through the middle conductor layer at a pressure position when subjected to pressure, such that a resistance signal is measured through the upper conductor layer and the lower conductor layer. At least two of the upper conductor layer, the middle conductor layer, and the lower conductor layer remain isolated. Based on this, the two-wire fabric touch panel of the disclosure has a simple structure with only two wires, simplified wiring, an extremely simple circuit, and easy data reading. Compared with matrix scanning of the existing flexible pressure sensor matrix, the disclosure simplifies wiring with only two wires, greatly avoiding complex wiring. It allows for easy resistance signal reading, avoiding complex signal reading methods such as matrix scanning, saving peripheral circuit and computing resources, minimizing the number of wires and backend circuit complexity, while enhancing device stability and robustness.

Additional features and advantages of the disclosure will be set forth in the description which follows, and in part will be apparent from the description, or may be learned by practice of the disclosure. The objectives and other advantages of the disclosure may be realized and obtained by the structure particularly pointed out in the written description, claims and accompanying drawings.

BRIEF DESCRIPTION OF DRAWINGS

The accompanying drawings are used to provide a further understanding of the technical solution of the disclosure, and constitute a part of the description. Together with the embodiments of the disclosure, they are used to explain the technical solution of the disclosure, and do not constitute a limitation of the technical solution of the disclosure.

DETAILED DESCRIPTION

Figure 1:
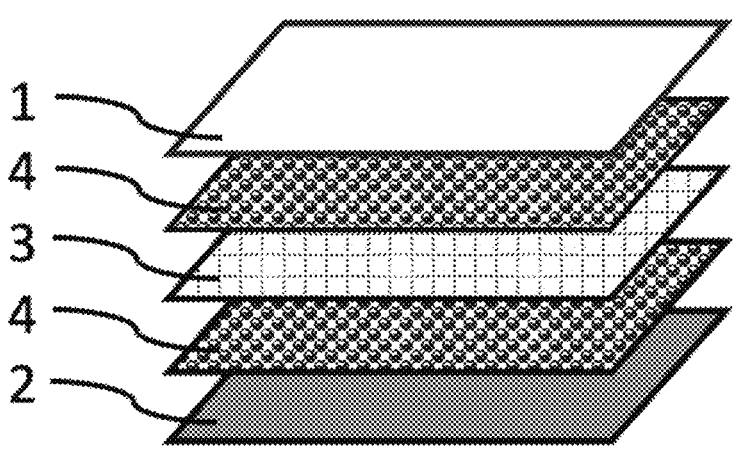
FIG. 1 is a schematic structural view of a two-wire fabric touch panel provided by embodiment 1 of the disclosure.

In order to make the objectives, technical solutions and advantages of the disclosure clearer, the disclosure will be further described in detail below with reference to the accompanying drawings and embodiments. It should be understood that the specific embodiments described here are only used to explain the disclosure and are not intended to limit the disclosure.

It should be understood that in the description of the embodiments of the disclosure, the meaning of "a plurality of (or multiple)" refers to two or more. The terms such as "greater than", "less than", "over" are understood not to include the specified number, while the terms such as "above", "below", "within" are understood to include the specified number. If described, the terms such as "first", "second" are merely for the purpose of distinguishing technical features, and not to be construed as indicating or implying relative importance or implicitly indicating the number of technical features indicated or implicitly indicating the precedence relationship of technical features indicated.

In order to solve the technical problems in the existing technology, which has a complex structure and requires a relatively large number of wires, embodiments of the disclosure provide a two-wire fabric touch panel, including: a first wire, a second wire, an upper conductor layer, a middle conductor layer, and a lower conductor layer, where the first wire is connected to the upper conductor layer, and the second wire is connected to the lower conductor layer. The middle conductor layer has a conductivity significantly lower than conductivities of the upper conductor layer and the lower conductor layer, and the middle conductor layer has different resistances at various positions in a plane. At least one of the upper conductor layer and the lower conductor layer is isolated from the middle conductor layer when an external force is absent, and the resistance between the upper conductor layer and the lower conductor layer is infinite. The upper conductor layer and the lower conductor layer are connected through the middle conductor layer at a pressure position when subjected to pressure, such that a resistance signal is measured through the upper conductor layer and the lower conductor layer. At least two of the upper conductor layer, the middle conductor layer, and the lower conductor layer remain isolated. Based on this, the two-wire fabric touch panel of the disclosure has a simple structure with only two wires, simplified wiring, an extremely simple circuit, and easy data reading. Compared with matrix scanning of the existing flexible pressure sensor matrix, the disclosure simplifies wiring with only two wires, greatly avoiding complex wiring. It allows for easy resistance signal reading, avoiding complex signal reading methods such as matrix scanning, saving peripheral circuit and computing resources, minimizing the number of wires and backend circuit complexity, while enhancing device stability and robustness.

The main body structure of the disclosure is composed of textile materials and can be divided into an upper conductor part, a middle conductor part, and a lower conductor part according to functions, hereinafter referred to as the upper conductor layer, the middle conductor layer, and the lower conductor layer. The middle conductor layer has a conductivity significantly lower than conductivities of the upper conductor layer and the lower conductor layer, and the middle conductor layer has different resistances at various positions in the plane. At least one of the upper conductor layer and the lower conductor layer is isolated from the middle conductor layer when the external force is absent, and the resistance between the upper conductor layer and the lower conductor layer is infinite. The upper conductor layer and the lower conductor layer are connected through the middle conductor layer at the pressure position when subjected to pressure, and a resistance signal can be measured through the upper conductor layer and the lower conductor layer. Since the middle conductor layer has different resistances at all locations, the resistance can be measured to determine the pressure position. In order to facilitate the isolation of at least two of the upper conductor layer, the middle conductor layer, and the lower conductor layer, the isolation layer may be selectively added. The isolation layer is provided with through holes to facilitate contact between the upper conductor layer or the lower conductor layer and the middle conductor layer when the pressure is applied, so as to form the conductive path. In addition, the upper conductor layer and the lower conductor layer each may also have a three-dimensional structure, including non-conductive protrusions, thereby supporting the upper conductor layer or the lower conductor layer to remain isolated from the middle conductor layer.

It should be noted that the application products of the disclosure are smart textiles, including, but not limited to, smart clothing, smart home furnishings, smart home textiles, smart car accessories, smart textile toys, etc. As the input terminal of the above-mentioned products, the disclosure can provide single-point pressing position information for smart devices.

In an embodiment, the upper conductor layer, the middle conductor layer, the lower conductor layer, and the possibly additional isolation layer are all made of textile materials. Therefore, they possess the advantages of softness, flexibility, washability, and dryability typical of wearable textiles.

In an embodiment, the middle conductor layer is a continuous or discontinuous flat conductor layer, which has three features: the first is that the middle conductor layer has different resistances at any unit plane position, thus ensuring that the resistance has a unique correspondence with the position; the second is that the resistance at any position of the middle conductor layer is at least one hundred times different than the resistance of the upper conductor layer and the lower conductor layer, that is, they have a resistance difference across orders of magnitude, thus ensuring that the upper conductor layer and the lower conductor layer serve as polar plates without interfering with the unique correspondence between resistance and position; and the third is that when the middle conductor layer is a continuous conductor, the thickness of each unit plane is much lower than the width of the unit plane, thereby ensuring that the current will move from top to bottom in accordance with the minimum energy law, rather than flowing through a parallel resistor circuit formed by the adjacent conductors. When the middle conductor layer is a discontinuous conductor, the thickness of each unit plane need not be much less than the width of the unit plane.

In an embodiment, the isolation between the upper conductor layer or the lower conductor layer and the middle conductor layer may be achieved by an additional isolation layer provided with through holes, or by non-conductive protrusions provided by the upper conductor layer or the lower conductor layer itself.

In an embodiment, the spatial resolution of the touch panel may be achieved by changing the distribution size of the differential resistance of the middle conductor layer, which may be accompanied by changes in the size of the through holes in the isolation layer, or by changes of the density of the non-conductive protrusions on the upper conductor layer and the lower conductor layer.

In an embodiment, the sensitivity of the touch panel to pressure may be adjusted by the thickness, the elastic modulus, and the size and density of the non-conductive protrusions of the upper conductor layer and the lower conductor layer. When the isolation layer is present, it may also be adjusted by the thickness, the elastic modulus, and the size and shape of the through holes of the isolation layer.

In an embodiment, the touch panel of the disclosure only requires two wires, one is connected to the upper conductor layer, and the other one is connected to the lower conductor layer, so that the measurement of the single-point pressing position can be realized. It should be pointed out that when there are two or more pressing positions, the resistances of the conductor layers in the two pressing positions will be connected in parallel, causing calculation errors. Therefore, the touch panel of the disclosure is limited to single-point position measurement.

In an embodiment, each of the upper conductor layer and the lower conductor layer may be a fabric with a metal coating or a conductive composite coating or an intrinsic conductive polymer coating, a fabric woven or knitted from conductive fibers, and a fabric woven or knitted from a mixture of conductive fibers and non-conductive fibers. The conductive coating may be attached to the fabric layer through screen printing, stencil printing, or spraying. The conductor layers may also be a double-layer or multi-layer flexible conductive film obtained by deposition, chemical plating, electrochemical plating, etc.

In an embodiment, the middle conductor layer may be a conductive nanocomposite, a conductive polymer composite material, a conductive fabric, or a textile or non-textile structure formed by a conductive yarn or filament or fiber with increasing or decreasing line resistance or non-uniform distribution in any form, each unit square of the conductor layer may be subjected to different number of printings to form different surface resistances, or conductive materials with different resistivities may be printed on each square respectively to form different surface resistances for each square. It is also possible to weave or knit each section of resistance using conductive yarns, filaments, or fibers with varying resistances according to specific rules, resulting in a two-dimensional plane where each interwoven unit has a unique surface resistance due to the different resistances of the raw materials such as yarns or fibers, thus creating a unique correspondence between the planar position and resistance.

In an embodiment, the additional isolation layer may be an elastic mesh fabric, an elastic net fabric, or a loose-structured elastic fabric woven or knitted from elastic fibers.

In an embodiment, the upper conductor layer, the middle conductor layer, the lower conductor layer, and the additional isolation layer may be attached with adhesives, hot-melt films, etc., but it should be noted that the adhesives or hot-melt films cannot cover the semiconductor working area to avoid the formation of an insulating layer between the two layers that affects functional use. Alternatively, they may also be integrated by sewing, or a three-dimensional weaving or knitting technology may be used to directly weave or knit the upper, middle, and lower conductor layers into a whole.

In an embodiment, the upper conductor layer, the middle conductor layer, the lower conductor layer, and the additional isolation layer are not limited to planar structures, but may also be curved structures, which can better fit curved objects such as a human body. It may even be processed into a three-dimensional structure to cover three-dimensional objects, thereby forming a three-dimensional single-point perception.

The embodiments of the disclosure will be further described below with reference to the accompanying drawings.

Embodiment 1

Referring to FIG. 1, this embodiment provides a two-wire fabric touch panel, which adopts a five-layer structure including two elastic isolation layers 4, an upper conductor layer 1, a lower conductor layer 2, and a middle conductor layer 3, which are adhered with one another using adhesives. The upper conductor layer 1 is obtained by silver-plating the surface of a polyester woven or knitted fabric to obtain conductivity. The lower conductor layer 2 is woven or knitted from copper-plated nickel yarns, so it has good electrical conductivity. Each of the elastic isolation layers 4 is a warp-knitted elastic knitted fabric from polyurethane filaments, which has a good elastic recovery ability and is woven or knitted with through holes. The middle conductor layer 3 is formed by printing a graphene silicone composite material on the front and back sides of loose porous cotton gauze. The thickness of the composite material printed on each square is different, so the surface resistance of each small square is different. The adhesives are hot-melt polyurethane film, and are distributed at the edge of the entire touch panel, so they will not affect the conduction between the upper conductor layer 1 and the lower conductor layer 2. When there is no external pressure, the upper conductor layer 1, the lower conductor layer 2, and the middle conductor layer 3 are isolated from each other due to the existence of the elastic isolation layers 4. When a single-point pressure is applied at a certain point, the upper conductor layer 1 and the lower conductor layer 2 are in contact with the middle conductor layer 3 through the middle elastic fabric layers 4 to form a conductive path. At this time, position detection can be obtained by measuring the resistance between the upper conductor layer 1 and the lower conductor layer 2. FIG. 1 shows a rectangular touch panel that can identify horizontal and vertical positions, that is, X and Y coordinates. The accuracy of coordinate identification depends on the size and density of the unit squares in the middle conductor layer 3.

Embodiment 2

Figure 2:
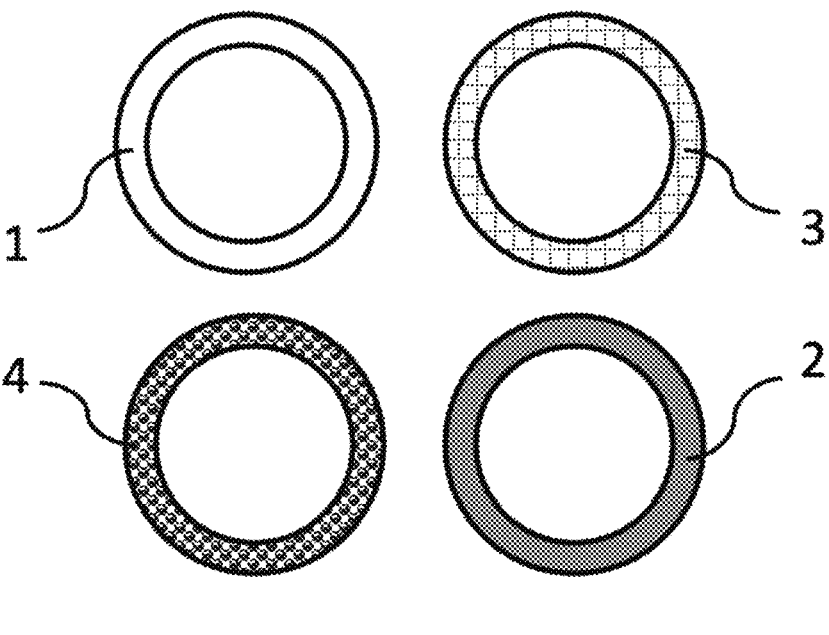
FIG. 2 is a schematic structural view of a two-wire fabric touch panel provided by embodiment 2 of the disclosure.

Refer to FIG. 2, this embodiment provides a ring-shaped two-wire fabric touch panel. The materials of the layers are the same as those in embodiment 1, but the combination methods are different. Compared with the embodiment 1, the elastic isolation layer 4 between the upper conductor layer 1 and the middle conductor layer 3 is omitted. Moreover, all the materials are not connected together using adhesives, but are fixed by sewing polyester sewing threads at the outer and inner edges of the ring. Such a ring-shaped two-wire fabric touch panel can realize the identification of the single point position of the ring, so it can realize the function of an iPod ring touch controller. In addition, after calibration, it can be used to identify circumferential angles ranging from 0° to 360°. When no pressure is applied, due to the existence of the elastic isolation layer 4 between the upper conductor layer 1 and the lower conductor layer 2, the resistance between the upper conductor layer 1 and the lower conductor layer 2 is infinite. When the pressure is applied at a certain point, the middle conductor layer 3 and the lower conductor layer 2 are connected through the elastic isolation layer 4. It should be noted here that although the upper conductor layer 1 and the middle conductor layer 3 are in direct contact, that is, they are conductive at any position, due to the huge difference in resistance therebetween and the fact that the flow of current will comply with the minimum energy law after the upper conductor layer 1 is connected with the lower conductor layer 2, the current will flow through the stressed position of the middle conductor layer 3, and will not affect the relationship between position and resistance.

Embodiment 3

Figure 3:
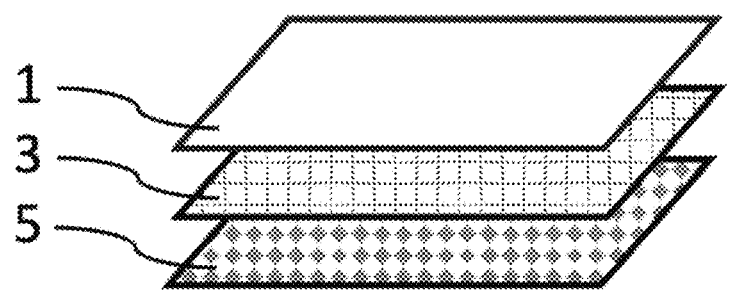
FIG. 3 is a schematic structural view of a two-wire fabric touch panel provided by embodiment 3 of the disclosure.

Referring to FIG. 3, this embodiment provides a two-wire fabric touch panel with a three-layer structure. The upper conductor layer 1 and the middle conductor layer 3 are the same as those in the embodiment 1. Different from the embodiment 1, there is no isolation layer here. Instead, insulator protrusions are arranged on the lower conductor layer 5. These protrusions play a supporting role and isolate the middle conductor layer 3 from the lower conductor layer 5. Only when a force is applied, physical contact occurs between the middle conductor layer 3 and the bottom layer 5 at the position where the force is applied, resulting in conduction therebetween. The lower conductor layer 5 may be completely realized by weaving or knitting, or may also be realized by using a glue dispensing machine to apply silicone dots on the conductive fabric. Of course, if the weaving or knitting method is completely adopted, copper-nickel-plated yarns and nylon yarns blended with spandex yarns may be preferable. A certain fabric structure such as a convex strip structure is used to form the nylon yarns into rows of narrow convex strips, and the base layer is completely copper-plated nickel yarns, so that the nylon yarns and spandex yarns act as the elastic isolation layer. When the glue dispensing machine is used, a cotton-polyester fabric with PEDOT: PSS coating may be preferable and is glued at regular intervals on the surface of the fabric, with the material of silicone. The silicone lattice formed in this way can also function as the elastic isolation layer. Regarding the processing method, these three layers may also be combined together using sewing thread fixation.

Embodiment 4

Figure 4:
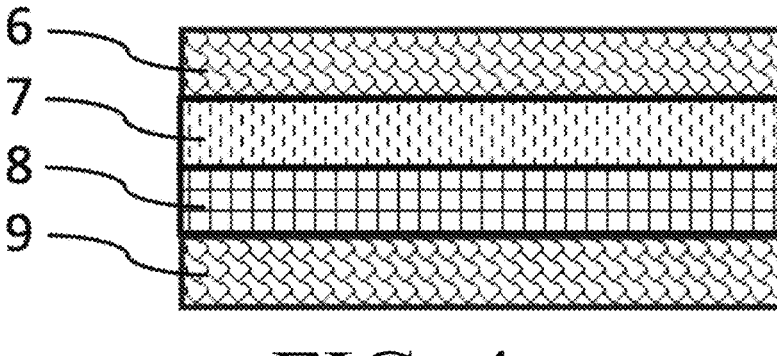
FIG. 4 is a schematic structural view of a two-wire fabric touch panel provided by embodiment 4 of the disclosure.

Referring to FIG. 4, this embodiment provides a three-dimensional woven fabric touch panel. The touch panel is woven integrally, which may be three-dimensionally woven, three-dimensionally braided, or three-dimensionally knitted. According to the functional division, its uppermost layer is the upper conductor layer 6, followed by the isolation layer 7, with the middle conductor layer 8 below, and the bottommost layer is the lower conductor layer 9. Because of this three-dimensional weaving or knitting process, when the external pressure is absent, the upper conductor layer 6 and the middle conductor layer 8 are isolated from each other due to the presence of the isolation layer 7, and the upper conductor layer 6 is in contact with the middle conductor layer 8 through the isolation layer 7 and is connected to the lower conductor layer 9 when subjected to pressure. When pressure is applied at different positions, the output resistance of the touch panel changes depending on where the pressure is applied. By measuring the resistance value, the plane position information of the force can be detected.

The upper conductor layer 6 is made of silver-plated nylon yarns to form a plain weave. The isolation layer 7 is formed of connecting yarns and isolation yarns containing spandex. The middle conductor layer 8 is woven or knitted with semiconductor yarns with longitudinal resistance gradient changes. Since the resistance of each section of each yarn is different in space, conductive fabrics with different resistances at various positions in a plane can be realized by either the weaving or knitting method. For example, when weft-knitting a plain knitted fabric with one yarn, since the resistance of the yarn gradually increases from start to finish, the resistance is minimum at the initially formed coil position and maximum at the last coil position. The gradient change in the resistance of conductive yarns can be achieved by controlling the thickness or number of layers of the yarn surface coating, or by applying materials with different conductivities at different positions on the yarn surface, for example, the adding amounts of conductive phase carbon nanotubes in polyurethane/carbon nanotubes are different in various positions of the yarn. It can also be achieved by controlling the thickness of the pure semiconductor yarn itself, for example, the entire yarn goes from thick to thin, such as polyamide/graphene, polyimide/carbon nanotube composite fibers, that is, a combination of various types of chemical fibers and conductive fibers. The lower conductor layer 9 may be woven or knitted with carbon fibers.

Since the touch panel in this embodiment is formed by one-time weaving or knitting, its spatial structure has unparalleled stability, will not cause lateral dislocation, has excellent durability and bending resistance, and also has the washing resistance and dry resistance of conventional textile fabrics. Moreover, the processing is more efficient, offering greater advantages for large-scale assembly line operations.

Embodiment 5

Figure 5:
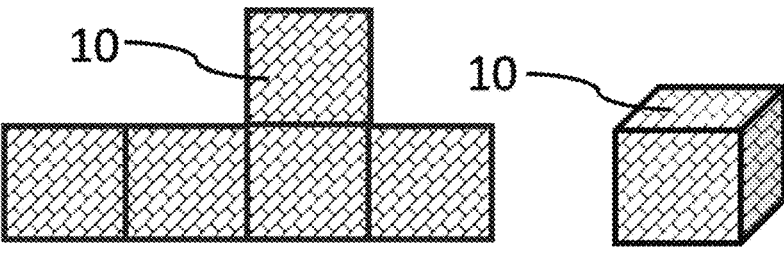
FIG. 5 is a schematic structural view of a two-wire fabric touch panel provided by embodiment 5 of the disclosure.

Referring to FIG. 5, this embodiment shows an example of the application of a two-wire fabric touch panel in a non-planar state. A fabric touch panel 10 is prepared according to the shape on the left, and its size matches a toy cube to be covered. After preparation, the fabric touch panel 10 is sewed along the edge to form a three-dimensional structure, and the structure is arranged around the target toy cube. This allows for the recognition of pressure on the upper surface, left and right surfaces, and front and back surfaces of the cube, which are five surfaces in total, or allows for recognition of pressure points on each of the five surfaces of the cube. Of course, the three-dimensional structure may also be spherical, ellipsoidal or even irregular in shape, and the textile touch panel can be sewed to form a good enveloping effect. In addition, when each structural layer contains elastic fibers, the entire fabric touch panel can be stretched both horizontally and vertically, so the fabric touch panel can work in non-planar situations, such as being able to fit perfectly with an upper half of a basketball, enabling the recognition of the striking position on the basketball.

The disclosure utilizes a variety of conductive composite materials, conductive textile materials, and ordinary fiber yarn fabrics as raw materials. By leveraging the design of textile and fiber composite structures, and using textiles as the base materials, it employs conventional processes in the textile and garment industry such as spinning, spinning yarn, weaving, knitting, printing, ironing, patching, and sewing.

This results in a fabric touch panel that has the light and soft characteristics of textiles and is equipped with only two wires.

It should be noted that all materials of the fabric touch panel of the disclosure are made of textile materials, and have the unique attributes of textiles such as being light, soft, comfortable, durable, machine washable, and dryable, and can be well integrated with traditional textiles. They are different from traditional hard photoelectric or silicon-based electronic components.

It should be noted that the fabric touch panel of the disclosure has a simple structure with only two wires, simplified wiring, an extremely simple circuit, and easy data reading. Compared with matrix scanning of other flexible pressure sensor matrix, the disclosure has unparalleled advantages, minimizing the number of wires and backend circuit complexity, while enhancing device stability.

It should be noted that the fabric touch panel of the disclosure has endless variations, such as position and angle measurement devices, electronic device controllers with planes or curved surfaces or even three-dimensional spaces, such as flexible keyboards, textile keyboards, textile pressure touch panels, etc., and can be flexibly used in various smart homes, smart clothing, IoT devices, and even medical and military products.

Based on this, compared with the existing technology, the two-wire fabric touch panel of the disclosure at least has the following beneficial effects:

1. The two-wire fabric touch panel is thin, soft and comfortable, and can be used to realize single-point position measurement of the entire touch curved surface or plane position.

2. The two-wire fabric touch panel is simple in structure, easy to manufacture, low in cost, and easy to produce.

3. The two-wire fabric touch panel is strong in bending and shear resistance, resistance to bending fatigue, shear fatigue, compression fatigue, and is machine washable and dryable.

4. The two-wire fabric touch panel has simple wiring with only three or four wires, avoiding complex wiring to the greatest extent; and resistance signals are easily read, avoiding complex signal reading means such as matrix scanning, and reducing the occupation of peripheral circuits and computing resources.

5. The two-wire fabric touch panel can be used for various textile-related wearable smart textiles such as smart pillows, smart shoes and insoles, smart school bags, smart cushions, smart mattresses, smart clothing, etc., and can provide functions such as plane single point position measurement, plane angle measurement, curved surface single point measurement, and single point position measurement on the surface of a three-dimensional object.

The above is a detailed description of the preferred implementation of the disclosure, but the disclosure is not limited to the above-mentioned embodiments. Those of ordinary skills in the art can also make various equivalent modifications or substitutions without deviating from the sharing conditions of the gist of the disclosure. These equivalent modifications or substitutions are all included in the scope defined by the claims of the disclosure.

What is claimed is:

1. A two-wire fabric touch panel, comprising: a first wire, a second wire, an upper conductor layer, a middle conductor layer, and a lower conductor layer, wherein the first wire is connected to the upper conductor layer, the second wire is connected to the lower conductor layer, the middle conductor layer has a conductivity lower than conductivities of the upper conductor layer and the lower conductor layer, and the middle conductor layer has different resistances at various positions in a plane, creating a unique correspondence between the position and resistance, wherein at least one of the upper conductor layer and the lower conductor layer is isolated from the middle conductor layer when an external force is absent, and a resistance between the upper conductor layer and the lower conductor layer is infinite, and wherein the upper conductor layer and the lower conductor layer are connected through the middle conductor layer at a pressure position when subjected to pressure, such that a resistance signal is measured through the upper conductor layer and the lower conductor layer, and at least two of the upper conductor layer, the middle conductor layer and the lower conductor layer remain isolated.

2. The two-wire fabric touch panel according to claim 1, wherein at least one of the upper conductor layer and the lower conductor layer has a non-conductive protrusion structure to support the at least one of the upper conductor layer and the lower conductor layer to remain isolated from the middle conductor layer.

3. The two-wire fabric touch panel according to claim 1, further comprising an elastic isolation layer between one of the upper conductor layer and the lower conductor layer and the middle conductor layer, or comprising elastic isolation layers respectively between the upper conductor layer and the middle conductor layer, and between the middle conductor layer and the lower conductor layer, wherein the elastic isolation layer or each of the elastic isolation layers is provided with through holes, such that when subjected to the external force, at least one of the upper conductor layer and the lower conductor layer is in contact with the middle conductor layer through the through holes to form a conductive path.

4. The two-wire fabric touch panel according to claim 3, wherein the upper conductor layer, the middle conductor layer, the lower conductor layer, and the elastic isolation layer or layers are made of a textile material, and the elastic isolation layer or each of the elastic isolation layers is of a planar structure or a curved surface structure.

5. The two-wire fabric touch panel according to claim 3, wherein the elastic isolation layer or each of the elastic isolation layers is any one of an elastic mesh fabric, an elastic net fabric, or a loose-structured elastic fabric woven or knitted from elastic fibers, and is connected to at least two of the upper conductor layer, the middle conductor layer, and the lower conductor layer through adhesives, sewing integration or three-dimensional weaving or knitting technology.

6. The two-wire fabric touch panel according to claim 1, wherein when the middle conductor layer is a continuous conductor, a thickness of each unit plane of the middle conductor layer is lower than a width and a length of the unit plane.

7. The two-wire fabric touch panel according to claim 1, wherein each of the upper conductor layer and the lower conductor layer is a fabric with a metal coating or a conductive composite material coating or an intrinsic conductive polymer coating, or a fabric woven or knitted from conductive fibers, or a fabric woven or knitted from a mixture of conductive fibers and non-conductive fibers.

8. The two-wire fabric touch panel according to claim 1, further comprising a fabric layer, wherein the upper conductor layer and the lower conductor layer are attached to the fabric layer through screen printing, stencil printing or spraying.

9. The two-wire fabric touch panel according to claim 1, wherein the upper conductor layer and the lower conductor layer are double-layer or multi-layer flexible conductive films obtained by deposition, chemical plating, or electrochemical plating.

10. The two-wire fabric touch panel according to claim 1, wherein the middle conductor layer is any one of a conductive nanocomposite, a conductive polymer composite material, and a conductive fabric, and each unit square of the middle conductor layer is subjected to different number of printings to form different surface resistances, or conductive materials with different resistivities are printed on each square respectively to form different surface resistances for each square, or conductive yarns, filaments or fibers with different resistance at each section are woven or knitted into cloth according to specific rules.

\* \* \* \* \*